United States Patent [19]
Gustafson et al.

[11] Patent Number: 5,336,345
[45] Date of Patent: Aug. 9, 1994

[54] PROCESS FOR MANUFACTURING AN ELONGATED ELECTROLUMINESCENT LIGHT STRIP

[75] Inventors: Thomas L. Gustafson, Southfield; Marc A. Brookman, Dearborn, both of Mich.

[73] Assignee: The Standard Products Company, Cleveland, Ohio

[21] Appl. No.: 978,152

[22] Filed: Nov. 17, 1992

Related U.S. Application Data

[63] Continuation of Ser. No. 668,862, Mar. 13, 1991, abandoned.

[51] Int. Cl.⁵ ............................................. B29C 47/02
[52] U.S. Cl. ............................ 156/67; 156/244.12; 313/506; 313/509; 313/512; 428/690; 428/917
[58] Field of Search ................ 156/67, 244.12; 313/506, 509, 572; 428/690, 917; 445/25, 24

[56] References Cited

U.S. PATENT DOCUMENTS

| | | | |
|---|---|---|---|
| 2,650,169 | 8/1953 | Goldstein . | |
| 3,136,676 | 6/1964 | Fisch | 156/244.12 |
| 3,138,834 | 6/1964 | Shanok etr al. | 156/244.12 |
| 3,305,745 | 2/1967 | Clock et al. | 156/67 |
| 3,350,553 | 10/1967 | Cline | 156/67 |
| 3,375,131 | 3/1968 | Schmidt . | |
| 3,395,058 | 7/1968 | Kennedy | 156/67 |
| 3,456,043 | 7/1969 | Emery . | |
| 3,547,516 | 12/1970 | Shanok et al. . | |
| 3,610,917 | 10/1971 | Hunt . | |
| 3,790,775 | 2/1974 | Rosenblatt . | |
| 4,551,363 | 11/1985 | Fenech . | |
| 4,646,208 | 2/1987 | Hayashi et al. . | |
| 4,801,928 | 1/1989 | Minter | 362/147 |
| 4,904,508 | 2/1990 | Madonia . | |
| 4,916,008 | 4/1990 | Katayama et al. . | |
| 4,956,031 | 9/1990 | Mori et al. | 156/67 |

FOREIGN PATENT DOCUMENTS 3543847 6/1987 Fed. Rep. of Germany .

*Primary Examiner*—Caleb Weston
*Attorney, Agent, or Firm*—Harness, Dickey & Pierce

[57] ABSTRACT

An elongated electroluminescent light strip. An electroluminescent light element which has a layer of semitransparent film is encapsulated in a moisture impervious material. A process for extruding such a strip is also provided.

14 Claims, 4 Drawing Sheets

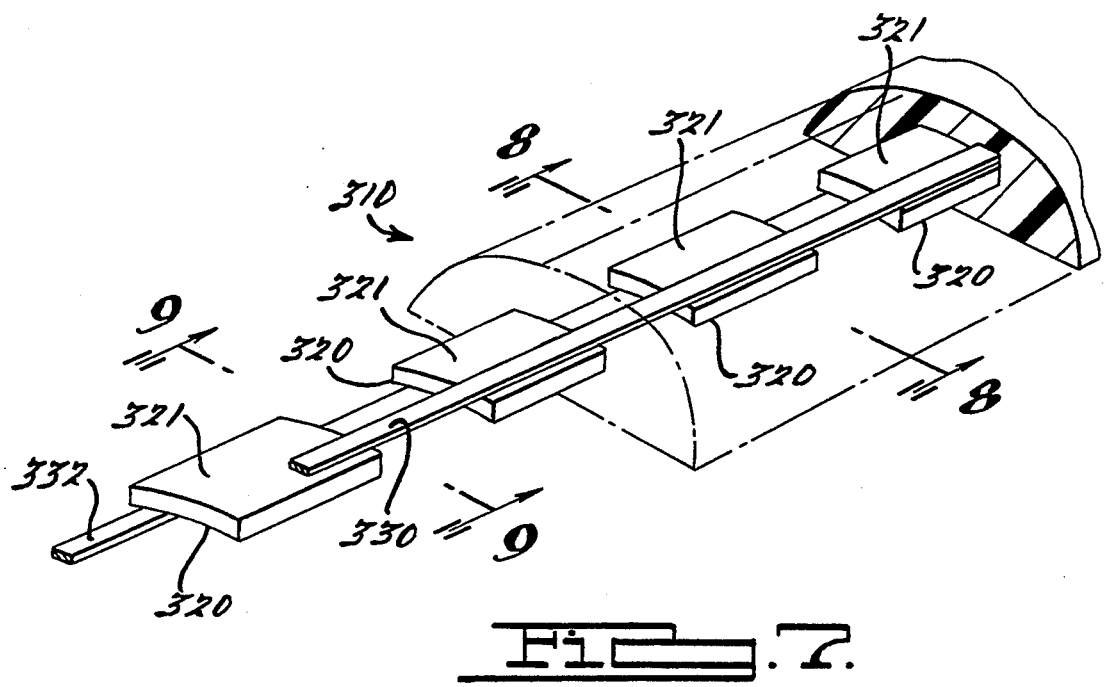
FIG. 7.
FIG. 8.
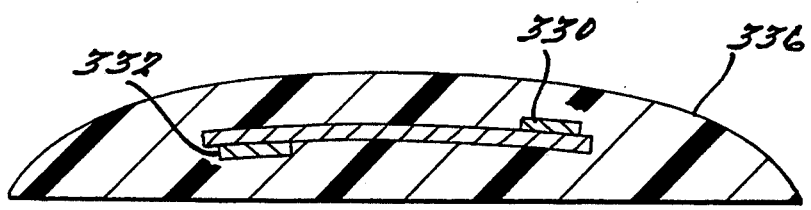
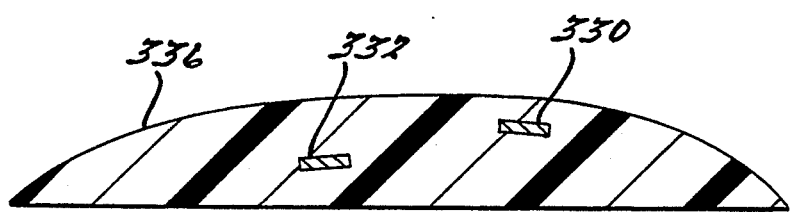
FIG. 9.

PROCESS FOR MANUFACTURING AN ELONGATED ELECTROLUMINESCENT LIGHT STRIP

This is a continuation of U.S. patent application Ser. No. 668,862, filed Mar. 13, 1991, abandoned.

BACKGROUND OF THE INVENTION

The present invention relates to an elongated electroluminescent light strip and to a continuous process for making such a strip. More particularly, the present invention relates to elongated electroluminescent light strips useful as moldings for vehicles and as building pathway and other light marking strips and to a continuous method of making such strips.

Electroluminescent lights have been known for many years and have been made by using conventional sheet lamination techniques to make a laminate structure of layers of a phosphor matrix sandwiched between an aluminum foil and a conductive transparent sheet such as a layer of indium tin oxide. The foil is insulated from the phosphor matrix by a dielectric coating and the sandwich is covered with a transparent moisture barrier film and as a polychlorotrifluoroethylene film.

Recently there has been development of electroluminescent technology for backlighting instruments and computer screens and for ornaments for vehicles. Three recent U.S. patents employing electroluminescent lamps in association with vehicles are U.S. Pat. Nos. 4,443,832 Apr. 17, 1984 to Kanamori et al. for "Self-illuminating Ornament for Vehicles; 4,494,326 Jan. 22, 1985 to Kanamori for "Electroluminescent Display Structure for Motor Vehicle Window" and 4,603,065 Jul. 29, 1986 to Mori et al. for "Decorative Part." An elongated electroluminescent light strip has also been developed and is disclosed in U.S. Pat. No. 3,161,797 Dec. 15, 1964 to Butter et al. for "Electroluminescent Device."

Conventional electroluminescent light techniques have encountered several problems. The phosphor matrix is extremely sensitive to moisture and one problem encountered in electroluminescent lamp construction relates to the destructive effect water vapor has on the phosphor layer. In a conventional laminate construction, a desiccant layer is sometimes used along with protective films having low vapor transmission rates to increase the longevity of the life of the phosphor matrix. The prevention of moisture encroachment into the lamp's interior is of paramount importance in electroluminescent light construction. However, conventional lights are made of relatively thin construction with the protection film having edges either adhesively bonded or thermally fused using high pressure rollers. The thin protection film provides marginal protection against moisture ingress and high pressure rollers, i.e., conventional sheet lamination techniques, can damage the thin, fragile layers of the electroluminescent light. Conventional lamination techniques also, of course, can lead to wrinkles which are unsightly and can lead to moisture ingress into the light's interior. Thermally fusing leads to another problem, i.e., possibly damaging the phosphor matrix by excessively heating it.

Another problem generally encountered in lamp construction relates to the relatively fragile nature of the various layers and of the lamp itself. Traditionally electroluminescent lights have been constructed to be as thin as possible and hence have had little inherent structural integrity. The electrically conductive layers are subject to damage during processing and, if wires are incorporated into the light, they tend to damage the other layers during manufacture of the light.

Thus, there remains a need for an improved electroluminescent light strip and for an improved continuous process for making an elongated electroluminescent light strip. In particular, there remains a need for an improved process in which the moisture sensitive electroluminescent lamp is well protected from the environment and which provides an electroluminescent lamp having good structural integrity. Also, as will be apparent to those skilled in the art, it would be desireable to have an economical, continuous process for making an elongated electroluminescent light strip.

SUMMARY OF THE INVENTION

The present invention relates to an extruded elongated electroluminescent light strip comprising an electroluminescent lamp element with a pair of longitudinally extending bus strips encapsulated by a low vapor transmission rate extrudate having a profile cross-sectional shape and well encapsulating and sealing the electroluminescent lamp element and bus bars including the longitudinal ends thereof. Preferred embodiments of the light strip include an insert in a body side molding for an automotive vehicle or a pathway light strip. Another preferred embodiment is a light strip comprising a plurality of lamp elements spaced longitudinally along the strip and well sealed therein. In accordance with the method of the present invention, an electroluminescent light strip is made by encapsulating an electroluminescent lamp element by extruding a polymeric plastic material having a low vapor transmission rate about the lamp element.

BRIEF DESCRIPTION OF THE DRAWINGS

FIG. 6 is a schematic view illustrating the process of the present invention;

FIG. 7 is a perspective view, partially in cross-section and broken away showing yet another preferred embodiment of an electroluminescent light strip of the present invention having spaced lamp elements and suitable, for example, for emergency pathway lighting;

FIG. 8 is a cross-sectional view taken along line 8—8 in FIG. 7;

FIG. 9 is a cross-sectional view taken along line 9—9 in FIG. 7; and

DESCRIPTION OF THE INVENTION

Figure 1:
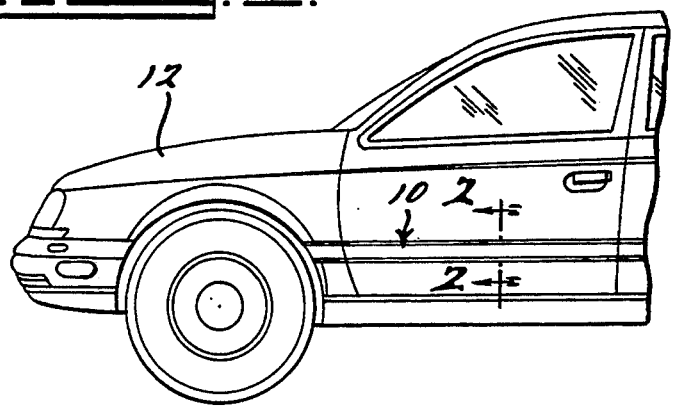
FIG. 1 is an elevational view, broken away, of an automotive vehicle with a preferred embodiment of the present invention mounted thereon as a body side molding.
Figure 2:
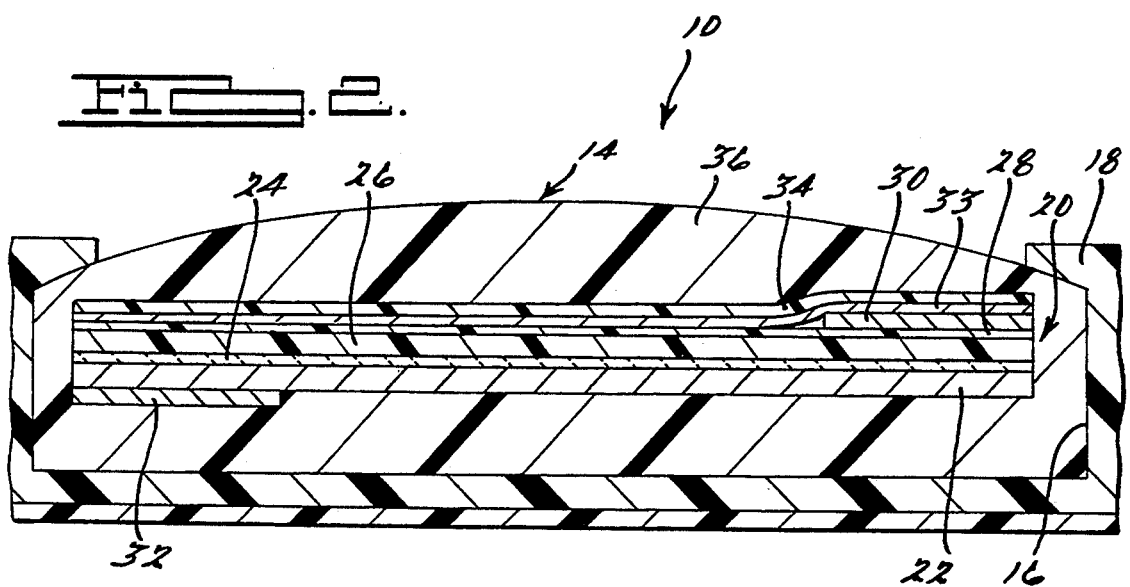
FIG. 2 is a sectional view taken along line 2—2 in FIG. 1.
Figure 3:
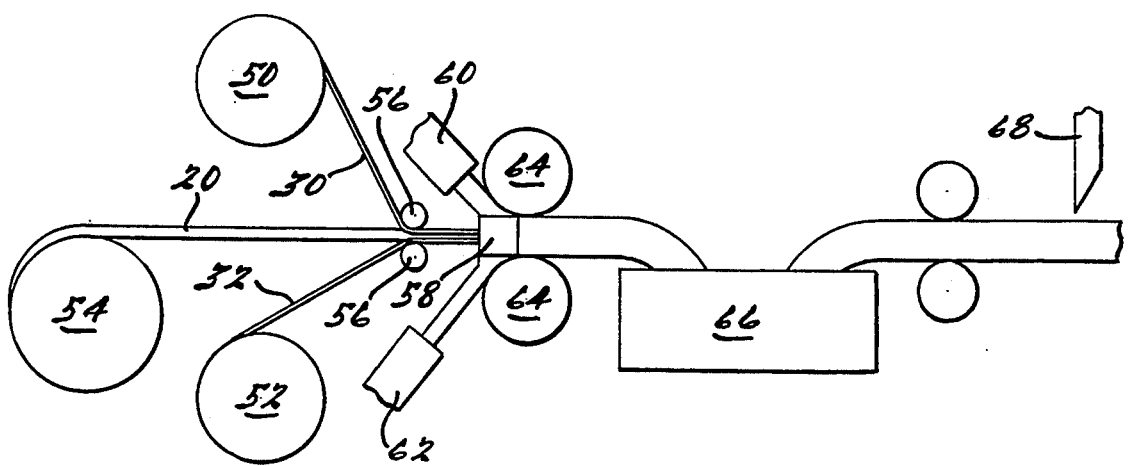
FIG. 3 is a perspective view partially in cross-section and broken away illustrating the insert of the body side molding of FIGS. 1 and 2.
Figure 3:
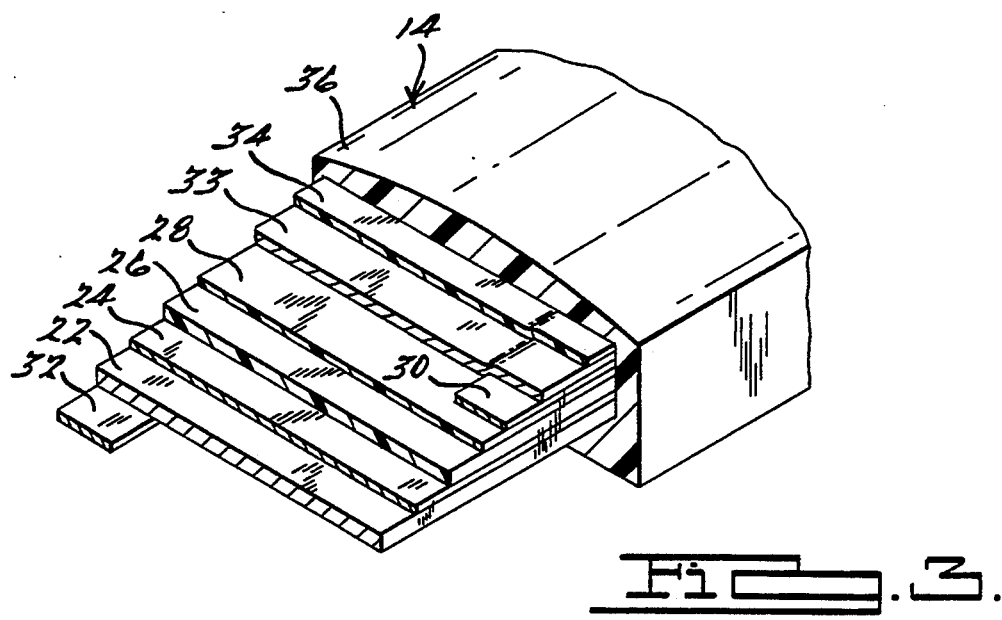

Now referring to the Figures, a preferred embodiment of the present invention is shown in FIG. 1 as a body side molding 10 on automotive vehicle 12. As best shown in FIG. 2, molding 10 broadly comprises elongated electroluminescent (hereinafter, "EL") light insert strip 14, snappingly held within channel 16 of base 18 of body side molding 10.

EL light insert strip 14 comprises an electroluminescent lamp 20 which has a laminate structure of layers of aluminum foil base electrode 22, dielectric coating 24 comprising barium titinate, phosphor matrix layer 26, and transparent conductive layer 28 comprising indium tin oxide. First bus bar 30 extends longitudinally along conductive layer 28 and is in electrical contact therewith. Second bus bar 32 extends longitudinally along base electrode 22 and is in electrical contact therewith. This ensures consistent electric potential along the length of EL lamp 20 and thereby provides even light color and intensity. Optionally, an additional coating of conductive ink can be used to enhance the conductivity between bus bar 30 and conductive layer 28. EL lamp 20 functions in the known manner for conventional electroluminescent lights.

In the embodiments herein bus bars 30 and 32 are shown as rectangular cross-section copper bars. However, conventional round copper wire or other elongate conductors could be utilized as bus bar elements in the process and articles of the present invention.

To enhance the appearance of molding 10 during daylight hours, EL lamp 20 has a semi-transparent overlayer of metallized film. For example, a polyester film 34 having a thin layer 33 of aluminum vacuum deposited on one side is suitable. Metallized film 34 preferably has about 50% light transmission and about 50% light reflectance.

EL lamp 20 and metallized film 34 are completely encapsulated by a moisture extrudate cover 36 to provide EL light insert strip 14. Cover 36 is continuous around EL lamp 20 and metallized film 34 except for the longitudinal ends of bus bars 30 and 32 as described further hereinafter. Cover 36 preferably comprises a low vapor transmission rate polymeric material such as Surlyn ®, an ionomer resin, high density polyethylene, or polychlorotrifluoroethylene.

Figure 4:
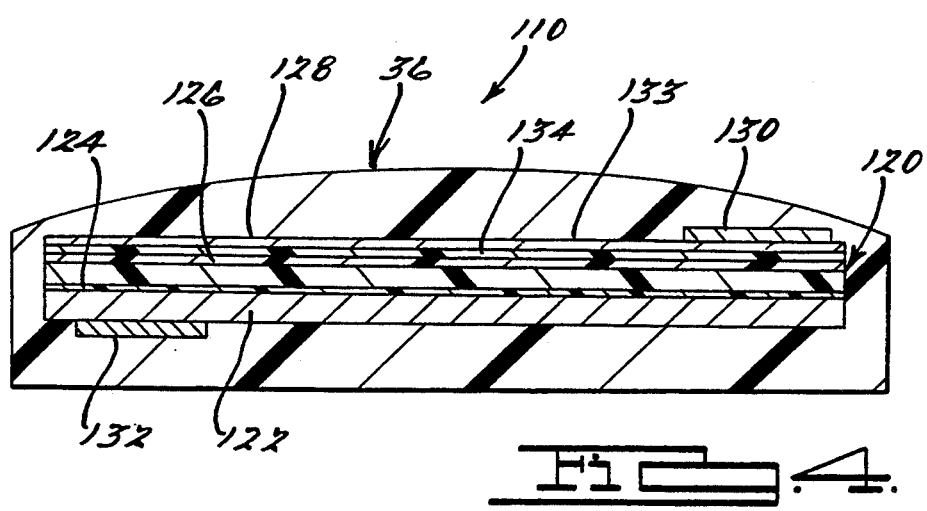
FIG. 4 is a cross-sectional view similar to FIG. 2 but showing another alternative preferred embodiment of the present invention.

An alternative preferred embodiment of the present invention is shown in FIG. 4 and indicated generally by the numeral 110. Molding 110 has EL lamp 120 which has an aluminum foil base electrode 122 coated with dielectric coating 124. Aluminum foil 122 provides one electrode and also provides reflection of light generated from the phosphor matrix layer as in molding 10. Molding 110 also has phosphor matrix layer 126, transparent conductive layer 128 and first and second bus bars 130 and 132. A metallized film 134 with metal layer 133 which is conductive in a range of from 1 to 4 thousand ohms per square inch is provided as a conductive overlayer such that bus bar 130 may be positioned on an opposite side of conductive layer 128 from phosphor matrix layer 126 instead of on the same side as in molding 10. EL lamp 120 is encapsulated in low vapor transmission rate extrudate 136 in a manner analogous to EL lamp 20.

Figure 5:
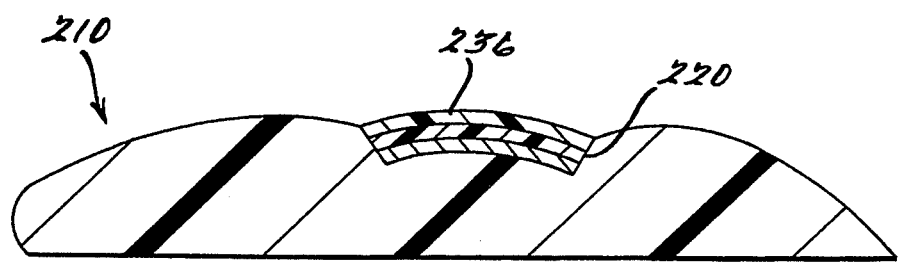
FIG. 5 is a cross-sectional view similar to FIG. 2 but showing another alternative preferred embodiment of the present invention.

Now referring to FIG. 5, yet another embodiment of the present invention is shown and indicated generally by the numeral 210. Strip 210 comprises an EL lamp of construction analogous to that of EL lamp 20 and indicated generally by the numeral 220. EL lamp 220 is encapsulated by extrudate 236 which is adhesively or fusion bonded into body 218 to provide strip 210. The EL light of this embodiment is electrified by conventional means such as electrodes on either end. The elongate strip is manufactured by an extrusion process as described further hereinafter for fully encapsulating the EL element from moisture.

Now referring to FIG. 6, a dual extrusion method for making an EL light strip of the present invention is schematically illustrated. Thus, first lower bus strip 30 is fed from roll 50, second bus strip 32 is fed from roll 52, joined with EL lamp 20 from roll 54 and passed between feeder rolls 56 and then through die 58 where extruders 60 and 62 provide encapsulating body 36 thereon. The strip is passed between shaping rollers 61 and then cooled in a cooling tank 66. The zone temperature profile for extruding surlyn ranges from 150° C. (302° F.) to 230° C. (446° F.) preferred die temperature is around 200° C. (392° F.). In a dual forming approach the lower and upper extrudate are each individually profiled as they exit the dies at a temperature of 200° C. The distance traversed to the forming rolls can be varied to allow for cooling adjustment which can vary with the mass of the profiled extrudate. A benefit of the dual extrusion approach is that the extrudates can be final formed through the forming rolls. This allows for the extrudates to breathe. That is, when the lamp is intruded into the extrusion the material displacement can be controlled by the forming rolls. Excess material can be vented to the side and trimmed. The result is a process which has very low pressure exerted on the surface of the lamp foil and does not drive the bus through the fragile lamp layers causing a short and also allows for some particle contamination without shorting out the lamp foil. Then the strip is cut into desired lengths by cut-off blade 68 for shipping and/or storage. Because of the sensitivity of the EL light to moisture and the like the EL light must be integrated in the strip by utilizing an environmentally controlled chamber or the like in the process. The EL lamp itself can be profiled so that the lamp can be arced, bent and injected between the two extrudates without losing form. Therefore the geometry of the lamp can be controlled independent of the geometry of the extrudates. A cross-head extrusion can also be used to provide encapsulating body 36 about EL lamp 20.

The above process may be accomplished by providing a feed horn (not shown) from an environmentally controlled chamber containing the EL lamp stock. A pair of tubes are provided immediately on the upper and lower sides of the feed horn for guiding of the bus bars 30 and 32. The feed horn is placed immediately adjacent the extruder and the EL lamp, bus bars and extruded strips are pulled through the extruder with chrome pinch type rollers for providing the continuous extruding process.

In order to electrically connect the EL light, the ends of EL insert 14 are cut, then encapsulating body 36 is stripped away from upper and lower bus bars 30 and 32. The bus bars are then connected to the desired sources of electricity.

Referring now to FIGS. 7 through 9, there is shown an alternate embodiment of an electroluminescent light strip 314 which has spaced EL lamp elements and has advantages in installations in the field. It has been problematic in the past that should an electroluminescent light need replacement it was sometimes necessary to access the electrical connections. During this process the EL light element of prior art structures might be exposed to moisture which would make the light inoperable. In this embodiment of the present invention this problem is solved in that suitable locations are provided for cutting and splicing of the wires while maintaining the EL light element in a moisture protected environment.

In accordance with this embodiment of the present invention, the strip 314 includes spaced EL lamp elements 320 which are encapsulated in a low vapor transmission rate polymeric extrudate 336. Lamp elements 320 are commonly electrically connected to first and second bus bars 330 and 332.

As shown in FIG. 9, the lamps are individually sealed in the polymer encapsulation material 336 such that they are isolated from one another. This allows the field installer the opportunity to cut the strip to a desired length between any pair of lamps and strip the encapsulating material from the bus bars at these locations without exposing any EL lamp materials to the environment.

As will be appreciated the length and the spacing of the lamps therebetween can be set up in any desired lengths which may be necessary in a particular application- The strips would be useful in trim strip applications for walkway markers or roadway markers and the like. Thus, the top surface 321 of each lamp element 320 can be provided with indicia or other markings.

Figure 10:
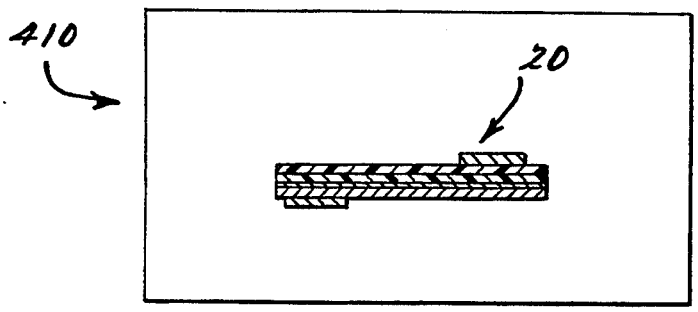
FIGS. 10–12 are each cross-sectional views similar to FIG. 2 but showing further alternative preferred embodiments of the present invention.
Figure 11:
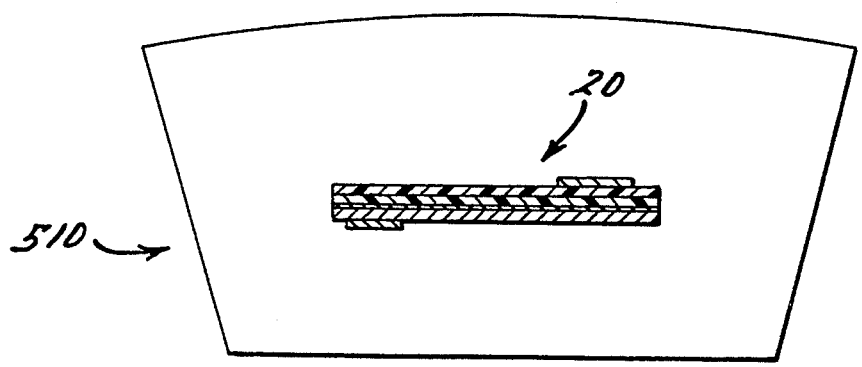
Figure 12:
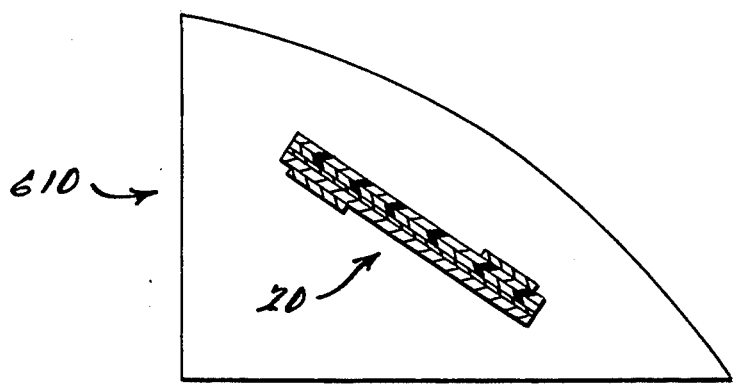

Further alternative preferred embodiments of the present invention are shown in FIGS. 10-12 which illustrate identical EL lamps 20 encapsulated in extrudates of different cross-sectional shapes. Thus, molding 410 has a rectangular cross-sectional shape, molding 510 has a bowed cross-sectional shape and molding 610 has a shape suitable for a corner molding.

What is claimed is:

1. A process for manufacture of an elongated electroluminescent light strip comprising the steps of:
    a) continuously feeding an elongated electroluminescent lamp having bus elements extending therefrom to an extruder; and
    b) extruding a plastic extrudant at a temperature less than that which would damage said elongated electroluminescent lamp about said elongated electroluminescent lamp to entirely encapsulate said electroluminescent lamp.

2. The process of claim 1 comprising the further step of interposing a layer of semi-transparent film over said electroluminescent lamp prior to the encapsulating step.

3. The process of claim 1 wherein said extrudant comprises ionomer resin.

4. The process of claim 1 wherein said extrudant comprises high density polyethylene.

5. The process of claim 1 wherein said extrudant comprises polychlorotrifluoroethylene.

6. The process according to claim 1 further comprising the step of positioning a bus bar along the entire length of the electroluminescent light strip on either side of the electroluminescent lamp for electrically energizing the electroluminescent lamp along substantially the entire length of the light strip.

7. The process of claim 6 wherein said elongated electroluminescent light strip is provided with a plurality of longitudinally spaced lamps.

8. A process for manufacture of an elongated electroluminescent light strip comprising the steps of:
    a) continuously feeding an elongated electroluminescent lamp having bus elements extending therefrom to an extruder;
    b) extruding a plastic extrudant at a temperature less than that which would damage said elongated electroluminescent lamp about said elongated electroluminescent lamp to entirely encapsulate said electroluminescent lamp; and
    c) passing said electroluminescent lap and extrudant between shaping rollers.

9. The process of claim 8 comprising the further step of interposing a layer of semi-transparent film over said electroluminescent lamp prior to the encapsulating step.

10. The process of claim 8 wherein said extrudate comprises ionomer resin.

11. The process of claim 8 wherein said extrudate comprises high density polyethylene.

12. The process of claim 8 wherein said extrudate comprises polychlorotrifluoroethylene.

13. The process of claim 8 further comprising the step of positioning a bus bar along the entire length of the electroluminescent light strip on either side of the electroluminescent lamp for electrically energizing of the electroluminescent lamp along substantially the entire length of the light strip.

14. The process of claim 13 wherein said elongated electroluminescent light strip is provided with a plurality of longitudinally spaced lamps.

* * * * *